H. E. WHITE.

METHOD OF MANUFACTURING EXPANDED METAL STRUCTURES.

APPLICATION FILED MAY 20, 1913.

Reissued Apr. 4, 1916.

14,101.

2 SHEETS—SHEET 1.

Inventor,

Herbert E. White.

Witnesses

Harry B. Rook.

Clare L. Small

By L. P. Wilhamptes.

his Attorney

H. E. WHITE.

METHOD OF MANUFACTURING EXPANDED METAL STRUCTURES.

APPLICATION FILED MAY 20, 1913.

Reissued Apr. 4, 1916. 14,101.

2 SHEETS—SHEET 2.

Inventor

Herbert E. White

Witnesses

Harry B. Rook

Elmer C. Small

By S. P. Wheaupton his Attorney

UNITED STATES PATENT OFFICE.

HERBERT E. WHITE, OF YOUNGSTOWN, OHIO, ASSIGNOR TO THE GENERAL FIRE-PROOFING COMPANY, OF YOUNGSTOWN, OHIO, A CORPORATION OF OHIO.

METHOD OF MANUFACTURING EXPANDED-METAL STRUCTURES.

14,101. Specification of Reissued Letters Patent. Reissued Apr. 4, 1916.

Original application filed June 21, 1911, Serial No. 634,616. Renewed August 31, 1912, Serial No. 718,144. Original No. 1,057,694, dated April 1, 1913. Application for reissue filed May 20, 1913. Serial No. 768,880.

*To all whom it may concern:*

Be it known that I, HERBERT E. WHITE, a citizen of the United States, residing at Youngstown, in the county of Mahoning and State of Ohio, have invented certain new and useful Improvements in Methods of Manufacturing Expanded-Metal Structures, of which the following is a specification.

Figure 1:
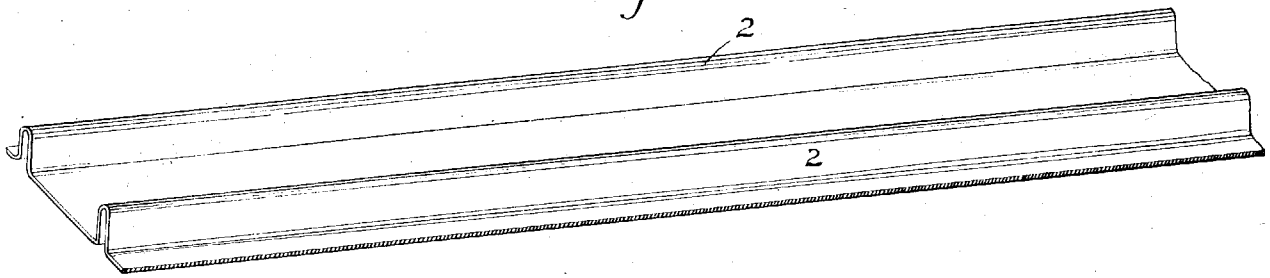
Figure 2:
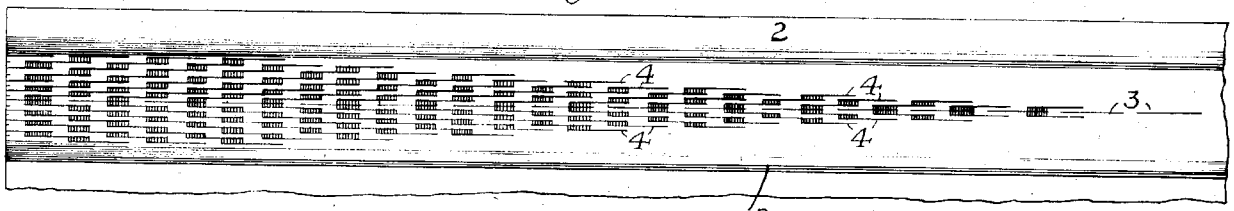
Figure 3:
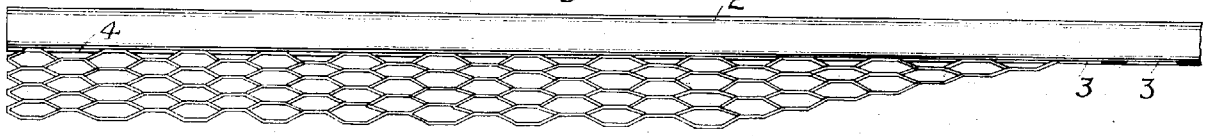
Figure 4:
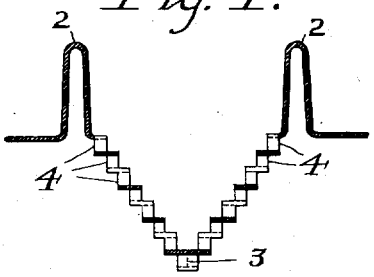
Figure 5:
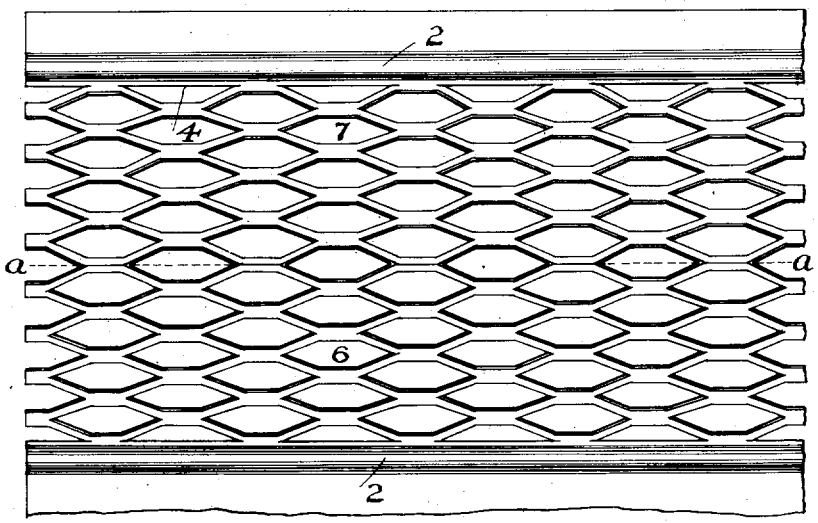
Figure 6:
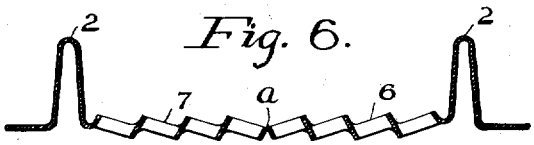

Figure 1 is a perspective view illustrating the first step in the manufacture, in accordance with my invention. Fig. 2 is a plan view, and Fig. 3 is a side view, illustrating the cutting operations. Fig. 4 is a cross-sectional view showing the cut blank before expanding. Fig. 5 is a plan view of a portion of the expanded blank or structure, and Fig. 6 is a cross-section of the expanded blank or structure.

My invention has relation to a novel method of forming expanded metal structures, and is designed to provide a method of this character by means of which expanded metal structures can be rapidly and accurately formed, in accordance with my invention.

In producing a structure embodying my invention, I first take a flat metal sheet and subject it to the action of dies to form therein the longitudinally extending, relatively deep, parallel ribs 2, as shown in Fig. 1. The sheet may be of any desired width and may be formed with any number of these parallel ribs, and the form of the ribs may be widely changed without departing from my invention. I next cut or slit the blank, the first cutting consisting of a series of alined longitudinal cuts 3, formed centrally between adjacent ribs, or between the pairs of adjacent ribs, and then make subsequent parallel cuts 4 at each side of the central line of cuts, each successive cut acting to stretch the metal between the cuts downwardly, so that the blank assumes the V-shape, shown in Figs. 2, 3 and 4.

Figs. 2 and 3 show the manner in which the cuts are successively made, until finally substantially the entire space between the adjacent ribs is cut and stretched so that a cross-section through two adjacent ribs and the intervening slitted portion, taken at any point through the length of the sheet, will have the general V-form shown in Fig. 4. Each series of cuts or slits is staggered or alternated with respect to those of the adjacent series, so as to produce a diamond mesh. This cutting or slitting can be very accurately done, since the ribs 2 act to greatly increase the stiffness of the sheet and permit it to be rigidly guided and held to the action of the cutting dies.

When the cutting or slitting has been completed, the blank is expanded laterally to bring the cut or slit portion or portions into a substantially flat plane, as shown in Figs. 5 and 6. The expanded structure then shows, between each pair of ribs, an expanded section of diamond mesh form with the slats or bars of the mesh inclined at a considerable angle to the flat plane of the structure, the bars 6 at one side of the longitudinal central line *a* of the expanded portion, being inclined reversely to the bars 7 at the opposite side of such central line. This inclination of the mesh bars, and particularly the reverse inclination at opposite sides of the central line *a*, greatly increase the strength and rigidity of the structure.

It will be readily understood that while I have shown a structure having only two ribs, the structure may be of any desired width, within practical limits, with an expanded section between each two adjacent ribs. The structure formed in the manner above described can be used for a variety of purposes, such as lathing, concrete reinforcement, etc.

When deep ribs are formed intermediate the expanded sections, such as those illustrated at 2 in the drawings, the structure may be used as a self furring lath, the ribs 2 acting as furring strips or ribs. The provision of these deep ribs prior to the cutting and expanding operations is a feature of considerable importance. By the initial provision of such ribs, not only is the sheet and the subsequent slitted structure very greatly stiffened and made more easy to handle in the subsequent operations, but it is the provision of these ribs which enables me to start the cutting and expanding at the central portion of each expanding section and work laterally in each direction, gradually drawing the meshes downwardly and stretching the metal from each side toward the center, as shown.

It is the purpose of the present invention to provide an improved process that may be successfully and commercially employed to slit and expand a metal sheet in the areas between ribs, or between unslitted areas without buckling or otherwise producing a contraction or distortion of said ribs or areas during the slitting, stretching, and expanding operation. And, to this end, the invention distinguishes from those processes wherein the slitting and expanding is worked from an external edge of a blank, and all other processes known to this applicant, in that the essential features of the present invention are the production of longitudinal slits in the metal sheet between the non-contractible unslitted areas or ribs, causing the strands formed thereby to be longitudinally elongated and pressed out of the plane of the sheet, and subsequently pulling the sheet laterally to deploy the stretched strands into their final form. From a practical standpoint, it has been found necessary and desirable to simultaneously perform the slitting and stretching operations, and to make, at some time during the cutting and stretching operation, at least two parallel cuts simultaneously. This procedure provides internal edges from which to work in cutting and stretching additional strands.

The novel structures produced by the method herein described are not claimed herein, and one of these novel structures forms the subject of my Patent No. 1,088,951, dated March 3, 1914.

I claim:

1. The method of making expanded metal structures which consists in first slitting the intermediate portion of a metal sheet, successively slitting the sheet on both sides of the first slits, said other slits being successively made nearer and nearer to the margins of the sheet, and deforming the slitted portions of the sheet into a substantially V or trough-shape to produce open meshes.

2. The method of making expanded metal structures, which consists in first making longitudinal slits in the intermediate portion of a metal sheet, successively making other longitudinal slits in the sheet on both sides of the first slits, said other longitudinal slits being successively made nearer and nearer to the margins of the sheet, and deforming the slitted portions of the sheet into a substantially V or trough-shape to produce open meshes.

3. The method of making expanded metal structures which consists in slitting a longitudinal area of a metal sheet leaving an unslit area on both margins of said slitted area and, simultaneously with said slitting operation, stretching the strands formed thereby and deforming the slitted and stretched portions into a trough-form depressed to one side of the original plane of the sheet.

4. The method of making expanded metal structures, which consists in first making longitudinal slits in the intermediate portion of a metal sheet, successively making other longitudinal slits in the sheet on both sides of the first slits and simultaneously stretching the metal in the strands between the slits, said other longitudinal slits being successively made nearer and nearer to the margins of the sheet, and deforming the slitted and stretched portions of the sheet into a substantially V or trough-shape to produce open meshes.

5. The method of making a reticulated metal product which consists in slitting inside areas of a metal sheet, leaving an unslit area on both margins of each slitted area, and gradually depressing the slitted areas longitudinally thereof in a substantially V or trough-shape, and then laterally spreading the depressed portions to thereby move the same back into substantially the original plane of the sheet.

6. The method of making expanded metal structures, which consists in first slitting the intermediate portion of a metal sheet, successively slitting the sheet on both sides of the first slit, said slits being successively made nearer and nearer to the margins of the sheet, simultaneously stretching and deforming the metal between the slits into a substantial V or trough-shape at one side of the plane of the original sheet, and afterward laterally expanding the cut portion of said sheet.

7. The method of making expanded metal structures, which consists in first forming in a metal sheet, spaced ribs, then cutting longitudinal slits in an intermediate portion of the sheet between the ribs, forming successive longitudinal slits on both sides of the first slits, the said latter slits being successively made nearer and nearer to the ribs, simultaneously stretching and deforming the metal between the slits to produce a substantial V-shape or trough between the ribs, and afterward laterally expanding the cut portion of said sheet to bring the same to substantially flat condition.

8. The method of making expanded metal structures having a plurality of unslitted areas which consists in producing longitudinal slits in the metal sheet between and parallel to said unslitted areas and causing the strands formed thereby to be longitudinally elongated and pressed out of the original plane of the sheet, and then spreading said slitted and expanded portions into final position.

9. The method of making expanded metal structures having a plurality of unslitted areas which consists in producing longitudinal slits in the metal sheet between said areas and simultaneously causing the strands formed thereby to be longitudinally elongated and pressed out of the original plane of the sheet, and spreading said slitted and expanded portions into their final position.

10. The method of making expanded metal structures having a plurality of spaced ribs which consists in producing longitudinal slits in the metal sheet between at least one pair of ribs and causing the strands formed thereby to be longitudinally elongated and pressed out of the plane of the original sheet, and then spreading said slitted and expanded portions into their final plane.

11. The method of expanding sheet metal, which consists in slitting the sheet in parallel lines of interrupted slits arranged alternately in adjacent lines, stretching longitudinally the metal of the strands formed by the rows of slits, and pulling the sheet laterally to deploy the stretched strands into open meshes.

12. The method of expanding sheet metal, which consists in slitting the sheet in parallel lines of interrupted slits arranged alternately in adjacent lines, stretching longitudinally the metal of the strands formed by the rows of slits transversely to the plane of the sheet, and pulling the sheet laterally to deploy the stretched strands into open meshes.

13. The herein described method of opening portions of a sheet blank into expanded metal open work comprising meshes of substantially diamond form, which consists in first slitting, stretching, and displacing to the side of the blank, the portion to be expanded, and then acting on the blank to cause the said displaced portion to be brought into a widened flat plane.

14. The method of making an expanded metal product which consists in slitting inside areas of a metal sheet, leaving an unslit area on both margins of each slitted area, and depressing the slitted areas into a substantially V or trough-shape, and then laterally spreading the depressed portions to thereby move the same back into substantially the original plane of the sheet.

15. The method of making expanded metal structures which consists in slitting a longitudinal area of a metal sheet leaving an unslit area on both margins of said slitted area, and simultaneously with said slitting operation stretching the strands formed thereby and displacing the stretched portion into a troughed form.

In testimony whereof I hereunto affix my signature in the presence of two witnesses.

HERBERT E. WHITE.

Witnesses:
F. H. Clark,
O. D. Kaiser.

Copies of this patent may be obtained for five cents each, by addressing the "Commissioner of Patents, Washington, D. C."